US006116273A

United States Patent [19]

Tarr et al.

[11] Patent Number: 6,116,273
[45] Date of Patent: Sep. 12, 2000

[54] FUEL METERING CHECK VALVE ARRANGEMENT FOR A TIME-PRESSURE CONTROLLED UNIT FUEL INJECTOR

[75] Inventors: Yul J. Tarr; Lester L. Peters; Bai Mao Yen; Laszlo D. Tikk; Ivar L. Johnson, all of Columbus, Ind.; Daniel G. Burns, Isle of Palms, S.C.; Mustahsen Gull, Columbus, Ind.; Harry L. Wilson, Columbus, Ind.; George L. Muntean, Columbus, Ind.

[73] Assignee: Cummins Engine Company, Inc., Columbus, Ind.

[21] Appl. No.: 08/849,129

[22] PCT Filed: Dec. 6, 1995

[86] PCT No.: PCT/US95/15873

§ 371 Date: Dec. 8, 1997

§ 102(e) Date: Dec. 8, 1997

[87] PCT Pub. No.: WO96/18033

PCT Pub. Date: Jun. 13, 1996

Related U.S. Application Data

[63] Continuation-in-part of application No. 08/354,063, Dec. 6, 1994, abandoned.

[51] Int. Cl.[7] .................................................... F16K 15/04

[52] U.S. Cl. ............................................ 137/539; 123/446

[58] Field of Search ................................ 137/539, 539.5, 137/542; 123/446, 501

[56] References Cited

U.S. PATENT DOCUMENTS

| | | | |
|---|---|---|---|
| 3,727,636 | 4/1973 | Simmons | 137/542 |
| 4,271,796 | 6/1981 | Sickler et al. | 123/321 |
| 4,494,570 | 1/1985 | Adkins | 137/539.5 X |
| 4,565,172 | 1/1986 | Hoshi | 123/446 |
| 4,893,630 | 1/1990 | Chisholm et al. | 137/539 |
| 5,326,034 | 7/1994 | Peters | 123/446 X |

FOREIGN PATENT DOCUMENTS

| | | | |
|---|---|---|---|
| 1135124 | 8/1962 | Germany | 137/539 |
| 1232849 | 5/1991 | United Kingdom | 137/539.5 |

*Primary Examiner*—John Rivell
*Attorney, Agent, or Firm*—Sixbey, Friedman, Leedom & Ferguson, P.C.; Charles M. Leedom, Jr.; Tim L. Brackett, Jr.

[57] ABSTRACT

Check valves (500) are incorporated into a fuel injector so as to form a controlling orifice in the system between the solenoid vales which direct fuel to the respective injection and timing chambers of the fuel injector and the chambers themselves. The precision fuel metering capability of the valve (500) is determined by an annular clearance created between the plunger (512) of the valve and the valve body (510) when the valve is in its maximum stroke. For achieving a bi-stable operation of the valve, the ratio of the plunger valve seat (**510*d*) area to the maximum plunger valve (512*b*) area and the spring (514) are key parameters. The check valves (500**) are formed as cartridge type check valves that can be calibrated outside of the injector prior to the installation thereof.

21 Claims, 9 Drawing Sheets

FUEL METERING CHECK VALVE ARRANGEMENT FOR A TIME-PRESSURE CONTROLLED UNIT FUEL INJECTOR

CROSS-REFERENCE TO RELATED APPLICATION

This application is a continuation-in-part of U.S. patent application Ser. No. 08/354,063, filed Dec. 6, 1994 now abandoned.

BACKGROUND OF THE INVENTION

1. Field of the Invention

The present invention is directed to fuel injectors of the type which include a check valve packaged in the lower nozzle assembly for fuel supply backflow-preventing purposes and a timing check valve packaged in the upper barrel assembly for timing fluid supply backflow-preventing purposes. In particular, to such fuel injectors which are of the unit fuel injector type which operate on the time-pressure metering basis.

2. Description of Related Art

U.S. Pat. No. 4,971,016 issued to Peters, et al. relates to a closed loop fuel supply system for high pressure fuel injectors providing precise and independent pressure control of both fuel and timing fluid on a pressure-time (P-T) basis. However, this control is achieved by pilot pressure controlled servo valves in supply passages leading to the injector and not by way of precision check valves positioned in the barrel of the injector itself.

The use of check valves for preventing the back flow of fluid in a fluid control system is known in a wide variety of arts as reflected, e.g., by U.S. Pat. Nos. 3,053,459; 3,374,502; 3,394,888; 3,685,739; and 5,056,488. Furthermore, the use of conventional ball type check valves to prevent back flow of fuel from injection and metering chambers is shown, for example, in U.S. Pat. No. 5,040,511 to Eckert. However, while Eckert provides a check valve in supply lines to the injection and metering chambers, these check valves play no part in the process of metering fuel into these chambers, the check valve merely being opened by the pressurized fuel supplied to the injector and remaining open until the entire amount of previously metered fuel is passed into the respective chamber.

In injection systems as disclosed by Eckert and others, the amount of fuel or timing fluid directed to the timing fluid chamber or injection chamber of a unit injector is controlled by metering systems which supply the respective chamber with a metered amount of fluid. This requires elaborate metering systems, e.g., wherein the fuel is passed through a metering orifice prior to its passage to the fuel injector itself. Consequently, numerous elements are required in order to pass the requisite amount of fuel to the unit fuel injector.

Furthermore, with conventional check valves, the spring and free floating ball tend to be unstable at certain flow ranges. That is, at certain engine speeds, fuel passing through the check valve causes the ball element to vibrate laterally within the check valve thus inducing unstable fuel flow and thus a significant variation in the flow of fuel through the valve. With today's high pressure unit injectors, it is essential that a stable and consistent check valve be provided so as to ensure that the metering of fuel to the injector be both consistent and uninterrupted to meet the stringent accuracy requirements.

SUMMARY OF THE INVENTION

It is a primary object of the present invention to devise check valves which will, in addition to the general functions of conventional check valves, provide precision metering of fuel, for injection and timing purposes, into the appropriate chambers of an injector and to further expand and improve upon the teachings of the parent application.

In keeping with the preceding embodiment, another object of the present invention is to provide a metering system which minimizes the operating requirements of the control valves used in the metering system.

Yet another object of the present invention is to provide for the stable flow of timing and metering fluid into respective timing and metering chambers of a fuel injector.

A still further object of the present invention is to provide a check valve wherein the flow characteristics of the fuel flowing through the check valve can be readily controlled through the selection of the diameter of the ball of the check valve, thereby controlling the clearance between the diameter of the valve ball and the valve housing.

An additional object of the present invention is to provide a check valve for the use in an internal combustion engine wherein movement of the ball of the check valve is inhibited when the valve is in an open condition.

It is a more specific object of the invention to provide check valves in accordance with the foregoing object which are formed as cartridge type check valves that can be calibrated outside of the injector prior to the installation thereof.

Yet another object of the present invention is to provide a check valve particularly suited for use as an injection metering check valve in which the fuel volume downstream of the valve seat is minimized.

In combination with the foregoing objects, it is a significant object of the present invention to provide check valves for metering and timing fuel flow control which function in a bi-stable manner.

These and other objects in accordance with the present invention are obtained by preferred embodiments thereof in which the inventive check valves are incorporated into a fuel injector so as to form a controlling orifice in the system between the solenoid valves which direct fuel to the respective injection and timing chambers of the fuel injector and the chambers themselves. That is, fuel supplied from the solenoids opens the check valves which, then, meter the supplied fuel quantities into the injector chambers.

In accordance with the invention, the precision fuel metering capability of the valve is determined by an annular clearance created between the ball or plunger of the valve and the valve body when the valve is in its maximum stroke. On the other hand, for achieving a bi-stable operation of the valve, the ratio of the plunger valve seat area to the maximum plunger valve area and the spring rate of the return spring are the key parameters.

The check valves fuel systems of an internal combustion engine, particularly for unit fuel injectors thereof, in accordance with some embodiments of the present invention, to control the fuel flow, include a housing, a fluid passage formed in the housing with at least a portion of the passage having first and second reduced diameter sections of predetermined cross-sectional areas, a valve seat formed in the fluid passage between the first and second reduced diameter sections, a ball having a predetermined diameter positioned in the first reduced diameter section of the fluid passage, and a ball stop positioned in the fluid passage downstream of the ball in the fuel flow direction. With the ball valve embodiments of the present invention, the diameter of the ball is related to the predetermined cross-sectional area of the first reduced diameter section such that an orifice of a predetermined size is formed between the ball and the fluid passage when the ball is in contact with the ball stop. Further, with certain the ball stop is positioned so as to maintain the ball in the center of the fluid passage when the ball is displaced against the ball stop so as to form a uniform spacing between the ball and the fluid passage to accurately control the flow of fuel therethrough.

In most preferred forms of the invention, the inventive check valves are formed as cartridge type check valves that can be calibrated outside of the injector prior to the installation thereof. Moreover, a most preferred injection metering check valve utilizes a stem valve construction that minimizes the downstream fuel volume of the valve and assembly in the nozzle (to optimize engine performance, transient response and emissions), a check valve having a ball type valve member is used for timing fluid flow control, due to the cost saving associated therewith in comparison to the stem valve embodiment.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
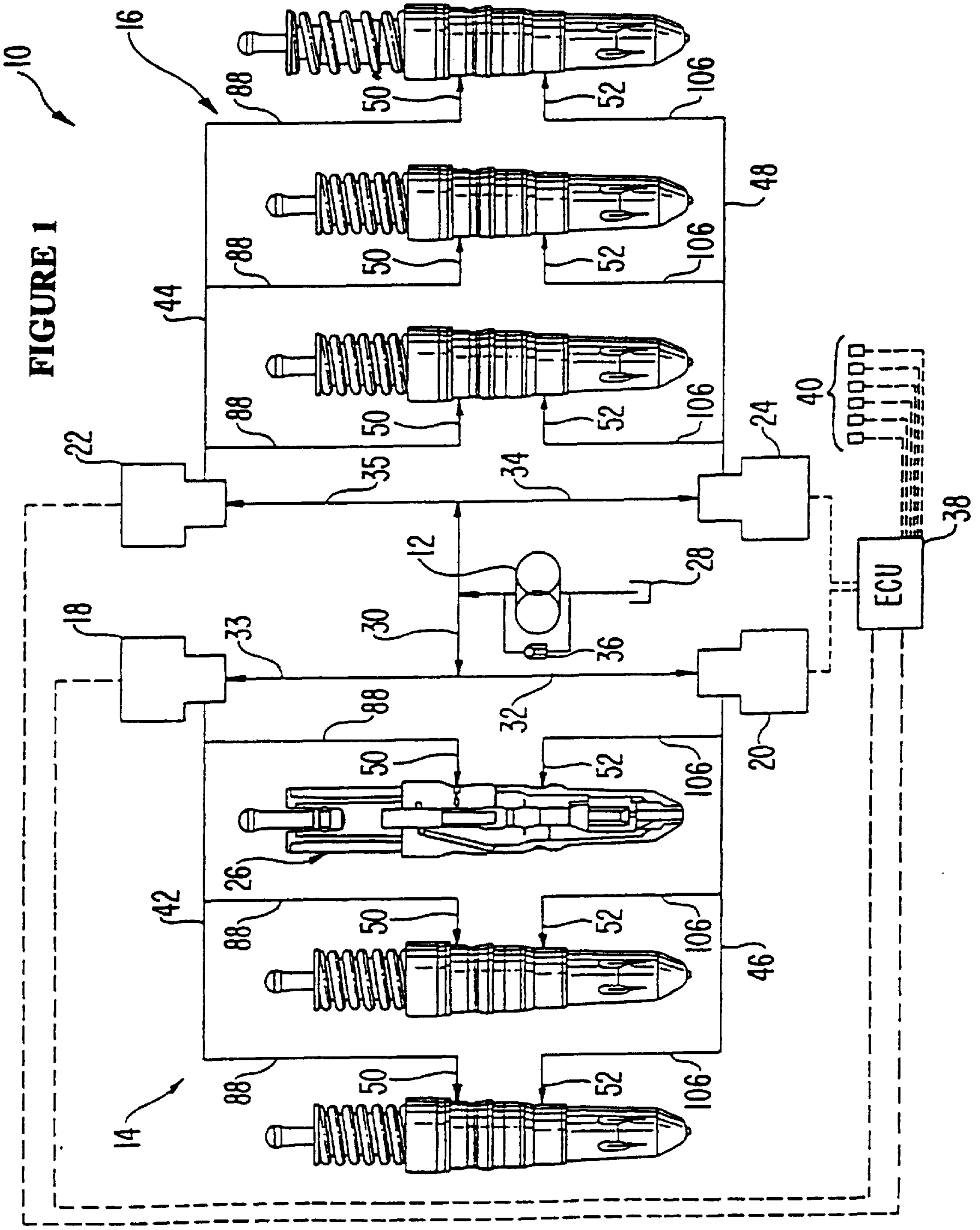
FIG. 1 is a schematic view of an individual timing and fuel injection metering system which may incorporate the present invention.

FIGS. 1–7 are the same as FIGS. 1–7 of the parent application and utilize the same reference numerals as shown there. FIG. 1 shows a timing fluid and injection fuel metering system 10 as applied to a six-cylinder engine (not shown) having one injector associated with each cylinder. The precision metering check valve in accordance with the present invention particularly suited for use in such a system. This system being substantially similar to the Individual Timing and Injection Fuel Metering System disclosed in U.S. Pat. No. 5,441,027, the contents of which are hereby incorporated herein by reference to the extent that it may be necessary to complete an understanding of the present invention.

Generally, the metering system 10 includes a fuel supply pump 12 for supplying low pressure fuel both to a first set of unit fuel injectors 14 via a timing fluid control valve 18 and an injection fuel control valve 20 and to a second set of unit fuel injectors 16 via a timing fluid control valve 22 and an injection fuel control valve 24. Each fuel injector 26 of each set of injectors 14, 16 is operable to create a timing period and a metering period within which the control valves 18, 20, 22, 24 operate to define the amount of timing fluid and injection fuel, respectively, metered to the injector. By providing separate timing and metering circuits controlled individually by a respective control valve, the metering system can effectively and predictably control both fuel injection timing and metering at the same time during the metering stroke of the injector plunger thereby maximizing the time period or window of opportunity available for metering of fuel and timing fluid. Moreover, the metering system maximizes the time period for metering for each injector of a particular set of injectors by selectively grouping the injectors with respect to the sequence of injection periods of the entire bank of injectors to allow the metering and timing periods of a specific group to be spread throughout the total cycle time of the engine.

Fuel supply pump 12 is a gear pump which draws fuel from a reservoir 28 and directs it to a common supply passage 30. Supply passage 30 supplies fuel to both a first fuel supply path 32 and a second fuel supply path 34 providing fuel for injection to the first and second set of injectors 14, 16 respectively. Supply passage 30 also supplies fuel to both a first timing fluid supply path 33 and a second timing fluid supply path 35 providing fuel, as timing fluid, to the first and second set of injectors 14, 16 respectively. A bypass valve 36 positioned in a bypass line of supply pump 12 maintains the fuel supply at a substantially constant pressure which is preferably between 100 and 500 psi. Bypass valve 36 is spring biased to open at a predetermined downstream fuel pressure to allow fuel from the outlet side of pump 12 to flow through the bypass line to the inlet side of pump 12 thereby maintaining the supply fuel pressure at the predetermined level.

The timing fluid control valves 18, 22 and injection fuel control valves 20, 24 are positioned in the respective timing fluid supply paths 33, 35 and fuel supply paths 32, 34 to control the flow of timing fluid and injection fuel to the respective injectors. The control valves 18, 20, 22, 24 are each of the electromagnetic or solenoid-operated type valve assemblies having valve elements operable between open and closed positions to control the flow of timing fluid and fuel from the supply paths 32, 33, 34, 35 to the injectors. The control valves 18, 20, 22, 24 are controlled by an electronic control unit (ECU) 38 which receives signals such as engine speed and position, accelerator pedal position, coolant temperature, manifold pressure and intake air temperature signals from corresponding engine sensors indicated generally at 40. On the basis of these signals, the ECU 38 judges the engine operating condition and emits control signals to the control valves 18, 20, 22, 24 such that the fuel injection timing and the amount of fuel to be injected through each injector 26 are optimized for the engine operating condition.

The first timing fluid control valve 18 and second timing fluid control valve 22 deliver fuel into the respective timing fluid common rail portions 42, 44 from the respective first and second timing fluid supply paths 33, 35. Likewise, first and second injection fuel control valves 20, 24 control the flow of fuel to respective first and second injection fuel common rail portions 46, 48 of the respective first and second fuel supply paths 32, 34. Each injector 26 includes a timing circuit 50 for receiving timing fluid from timing fluid common rail 42, 44 and a metering circuit 52 for directing fuel from common rail portions 46, 48 into the injector for subsequent injection into the corresponding cylinder of the engine.

Figure 2:
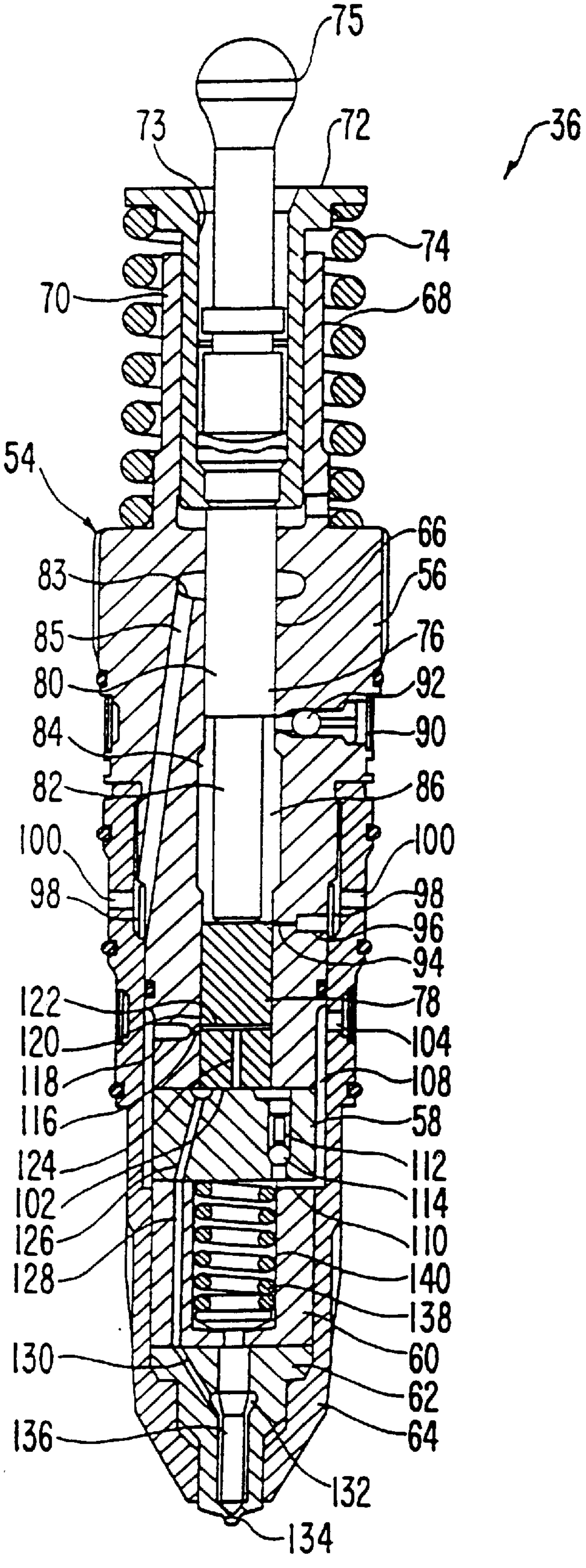
FIG. 2 is a cross-sectional view of a closed nozzle unit injector used in the metering system of FIG. 1 which may include a bi-stable check valve in accordance with the present invention.

A first type of unit fuel injector which may incorporate bi-stable check valves in accordance with the present invention will now be described in detail. Referring to FIG. 2, there is shown a closed nozzle unit fuel injector 36 which includes an injector body 54 formed from an outer barrel 56, a spacer 58, a spring housing 60, a nozzle housing 62 and a retainer 64. The spacer 58, spring housing 60 and nozzle housing 62 are held in a compressive abutting relationship in the interior of retainer 64 by outer barrel 56. The outer end of retainer 64 contains internal threads for engaging corresponding external threads on the lower end of the outer barrel 56 to permit the entire unit injector body 54 to be held together by simple relative rotation of retainer 64 with respect to outer barrel 56.

Outer barrel 56 includes a plunger cavity 66 which opens into a larger upper cavity 68 formed in an upper extension 70 of outer barrel 56. A coupling 72 is slidably mounted in upper cavity 68 and includes a link cavity 73 for receiving a link 75. Coupling 72 and link 74 provide a reciprocable connection between the injector and a driving cam (not shown) of the engine. A coupling spring 74 is positioned around extension 72 to provide an upward bias against coupling 72 to force link 75 against the injector drive train and corresponding cam (not shown). The drive train may include a rocker assembly for connecting link 75 to the cam.

Plunger cavity 66 extends longitudinally through outer barrel 56 for receiving both an outer timing plunger 76 and an inner metering plunger 78. Timing plunger 76 includes an upper portion 80 having an outer diameter which permits upper portion 80 to slidably engage plunger cavity 66 while substantially preventing fuel leakage between upper portion 80 and plunger cavity 66. Any fuel leaking by upper portion 80 is collected in an annular groove 83 and directed into a drain passage 85 communicating with groove 83. A lower portion 82 formed on the inner end of upper portion 80 extends inwardly towards spacer 58. Lower portion 82 has a smaller diameter than plunger cavity 66 and the upper portion 80 to form an annular cavity 84. The outermost end of timing plunger 76 contacts the innermost end of link 73 to cause the timing plunger 76 to move in response to cam rotation. The innermost end of inner portion 82 of timing plunger 76 together with the outermost end of metering plunger 78 forms a timing chamber 86 for receiving timing fluid from the particular timing fluid control valve 18, 22 associated with the set of injectors to which the injector belongs.

Timing circuit 50 provides both a delivery and a spill path for the timing fluid during each injection cycle. Timing circuit 50 includes a branch passage 88 (shown in FIG. 1), timing chamber 86 and various supply and spill passages which will now be described in greater detail. Timing fluid is provided to timing chamber 86 from timing fluid common rail portion 42 by branch passage 88 and a supply port 90 formed in outer barrel 56 and extending radially from timing chamber 86. In accordance with the present invention, a spring biased inlet bi-stable check valve 92 is positioned in supply port 90 prevents timing fluid from flowing from timing chamber 86 through supply port 90 while allowing timing fluid to pass into timing chamber 86 in a stable and controlled manner. The bistable check valve in accordance with the present invention is discussed hereinbelow in detail.

Outer barrel 56 includes a timing spill orifice 94 and a timing spill port 96 extending radially from cavity 66. Timing spill orifice 94 and spill port 96 provide communication between timing chamber 86 and annular timing fluid spill channel 98 formed between outer barrel 56 and retainer 64. Timing fluid drain ports 100 are provided in retainer 64 adjacent annular channel 98 to allow timing fluid to flow from annular channel 98 to a timing fluid drain system which is fluidly connected with that portion of the injector cavity (not illustrated) formed in the cylinder head of the engine adjacent timing fluid drain ports 100.

Fuel metering circuit 52 is formed to provide both a delivery and spill path for the metering fuel during each cycle of the engine. Fuel metering circuit 52 includes a metering chamber 102 and various supply and spill passages which will now be described in greater detail. As shown in FIG. 2, metering chamber 102 is formed between the innermost end of metering plunger 78 and spacer 58. Metering chamber 102 receives fuel from a fuel supply port 104 formed in retainer 64 which communicates with a branch passage 106 (shown in FIG. 1). Fuel flows through supply port 104 into an annular channel 108 formed between the lower portion of outer barrel 56 and retainer 64. Annular channel 108 continues inwardly between spacer 58 and retainer 64 to connect with a radial passage formed in the upper surface of spring housing 60. An inlet passage 112 extends through spacer 58 connecting radial passage 110 with metering chamber 102. In accordance with the present invention, a spring loaded bi-stable check valve 114 is positioned in fuel inlet passage 112 permits passage of fuel in a stable and controlled manner from fuel supply port 104 to metering chamber 102 while preventing fuel flow from metering chamber 102 through fuel inlet passage 112. Again, the significance of the bi-stable check valve will be discussed in greater detail hereinbelow. A metering spill orifice 116 and metering spill port 118 formed in the lower end of outer barrel 56 extend radially from cavity 66 adjacent the metering plunger 78 to communicate with annular channel 108. The metering plunger 78 includes an annular groove 120, a radial passage 122 and an axial passage 124 in communication with each other to permit fuel to flow from the metering chamber 102 to metering spill orifice 116 and the spill port 118 depending on the position of metering plunger 78 during the operation of the injector.

Figure 3:
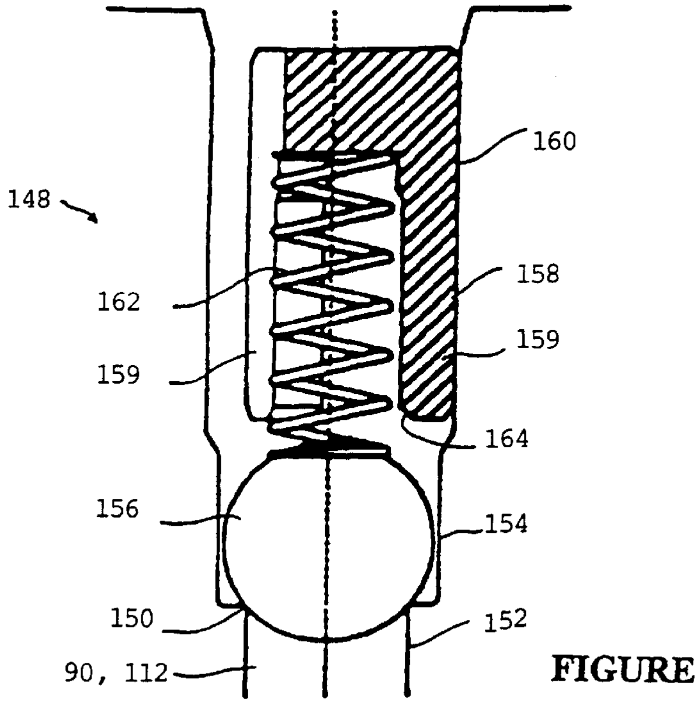
FIG. 3 is a cross-sectional elevational view of the bi-stable check valve in accordance with the present invention.

Referring now to FIG. 3, the bi-stable check valve in accordance with the present invention will now be described in greater detail. As illustrated in FIG. 3, the bi-stable check valve 148 is positioned within either the supply port 90 or inlet passage 112 of the unit fuel injector 36. In this region of the supply port 90 or inlet passage 112, the bore is stepped in order to form a valve seat 150 between the first reduced diameter section 152 and the second reduced diameter section 154. As can be seen from FIG. 3, the ball 156 of the check valve 148 is seated against the valve seat 150 when the check valve 148 is in the closed position. In order to maintain the ball 156 in the position illustrated in FIG. 3 when the valve is in the closed position, a retainer 158 is provided within the enlarged diameter section 160 of the fluid passage. Retained within the retainer 158 is a compression spring 162 which biases the ball 156 into contact with the valve seat 150 when the spring force of the compression spring 162 is capable of overcoming any pressure in the supply port 190 or inlet passage 112. Further, the retainer 158 includes a plurality of axially extending abutment legs 159 (in this case three legs) which contact the surface of the enlarged diameter section 160 to maintain retainer 158 in place while permitting the flow of fluid through the valve 148. As can also be appreciated from FIG. 3, the ball 156 is of a diameter slightly smaller than that of the second reduced diameter section 154. In doing so, an orifice is formed about an outer periphery of the ball 156 with the capacity of the orifice being readily controlled by the selection of the diameter of the ball 156. Accordingly, the diameter of the ball is so related to a predetermined cross-sectional area of the second reduced diameter section so as to provide an orifice of a predetermined size about the periphery of the ball 156.

Figures 4A, 4B, 4C:
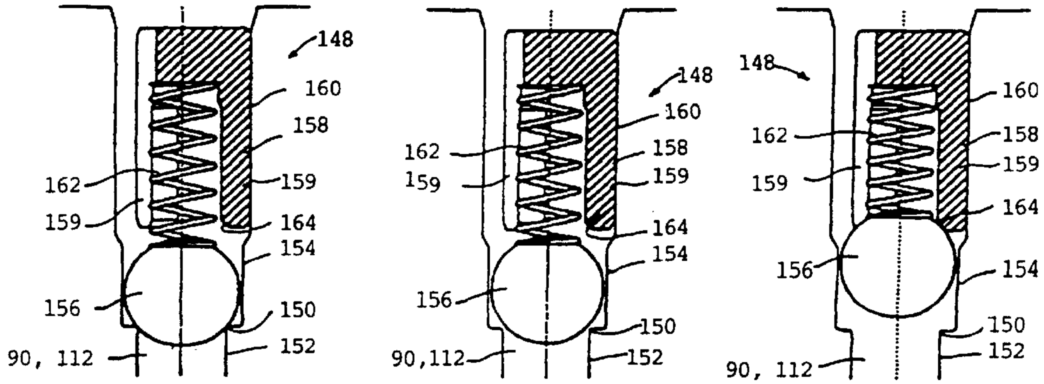
FIG. 4A is a cross-sectional view of the bi-stable check valve in accordance with the present invention in the closed position.
FIG. 4B is a cross-sectional view of the bi-stable check valve in accordance with the present invention in the partially open position.
FIG. 4C is a cross-sectional view of the bi-stable check valve in accordance with the present invention in the fully open position.

Referring now to FIGS. 4A, 4B and 4C, the operation of the check valve in accordance with the present invention will be described in greater detail. As illustrated in FIG. 4A, the compression spring 162 maintains the ball 156 in contact with the valve seat 150, thus preventing the flow of fluid in either direction around the ball 156. When a fluid pressure is applied through the passage 90, 112, the spring force of the compression spring 162 will be overcome and the ball 156 will begin to be displaced from the valve seat 150. In accordance with the present invention, a fluid pressure on the order of 100 PSI to 500 PSI is generally used in association with fuel supplies for fuel injectors. Consequently, it will be necessary to select the strength of the compression spring 162 in accordance with the particular fluid pressure of the system. When the ball 156 is initially displaced from the valve seat, as illustrated in FIG. 4B, fluid will begin to flow through the spacing between the ball 156 and the second reduced diameter section 154. In accordance with the preferred embodiment, the ball is in the range of 3.5–4.5 mm while the diameter of the second reduced diameter section is on the order of 3.7–4.7 mm and preferably 3.9 millimeters and 4.1 mm respectively. Similarly, the diameter of the first reduced diameter section is approximately 3.0 mm. This ensures that the abrupt edge between the first diameter section 152 and the second diameter section 154 forming the valve seat 150 will contact a medial portion of the ball, thus, ensuring proper seating of the ball 156 when in the closed position. Accordingly, in accordance with the present invention, there will be provided an orifice of approximately 1.25 $mm^2$ between the ball 156 and second reduced diameter section 154.

Continued travel of the ball 156 positions the ball in contact with the conical receiving surface 164 of the retainer 158 which acts as a stop for stopping continued travel of the ball 156 in the fluid flow direction. Further, the conical receiving surface 164 maintains the ball centrally positioned within the second reduced diameter section 154, thus stabilizing the ball 156 and preventing any lateral movement of the ball when the valve is in the open condition. In this regard, the orifice opening between the ball 156 and second reduced diameter section 154 may be maintained with a high degree of accuracy at the desired spacing of 1.25 $mm^2$. In doing so, buzzing which is associated with the prior art check valves is eliminated and a stable and consistent flow of fuel through the check valve is achieved. Accordingly, in utilizing a bi-stable check valve in accordance with the present invention, the check valve not only acts to prevent fuel from flowing back through the passage 90 or 112, but also acts as a flow control orifice for controlling the flow of fuel through the valve. Additionally, it can be noted that the size of the orifice formed between the ball 156 and second reduced diameter section 154 may be readily changed by varying the preferred size of the ball 156 itself. Accordingly, should greater flow be desired, a smaller ball would be utilized thus increasing the size of the orifice formed between the ball 156 and second reduced diameter section 154 when the valve is in the fully opened condition as illustrated in FIG. 4C. Further, it should be noted that because the ball is displaced a significant distance from the valve seat 150, the spacing between the valve seat 150 and ball 156 itself does not inhibit the flow control carried out by the orifice formed between the ball 156 and second reduced diameter section 154.

Figure 7:
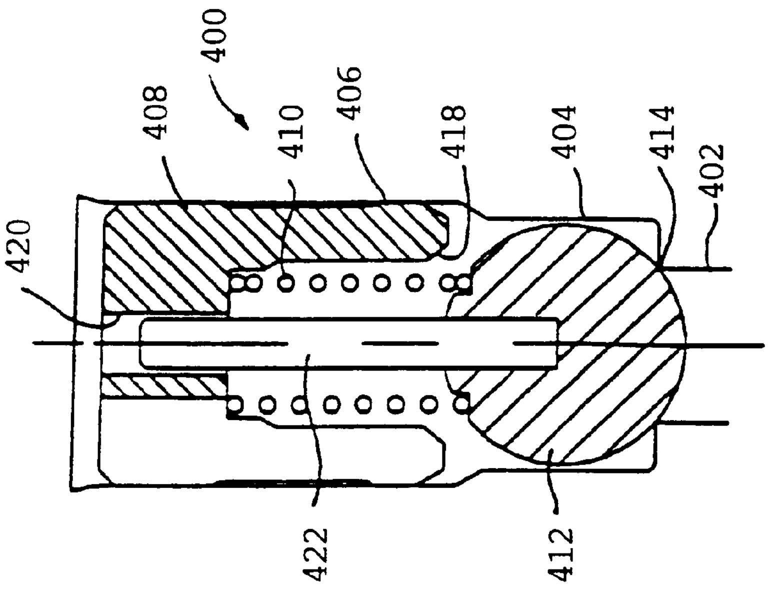
FIG. 7 is a cross-sectional elevational view of a bi-stable check valve in accordance with an alternative embodiment of the present invention.
Figure 6:
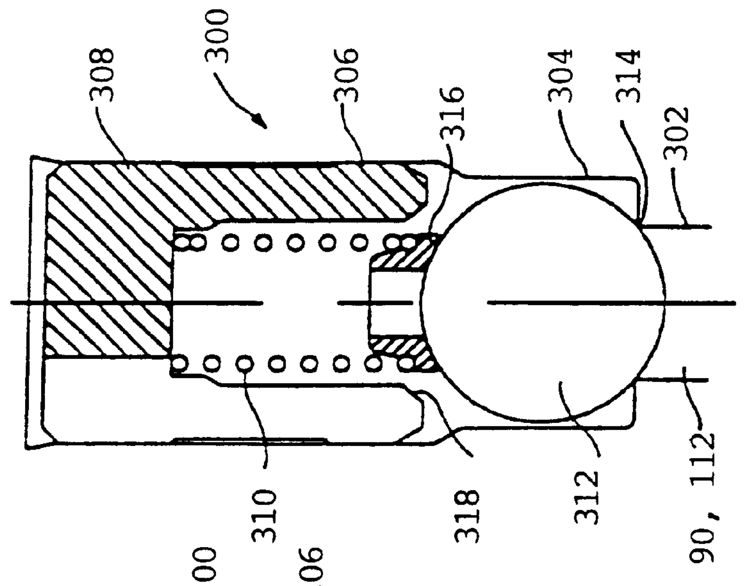
FIG. 6 is a cross-sectional elevational view of a bi-stable check valve in accordance with an alternative embodiment of the present invention.
Figure 5:
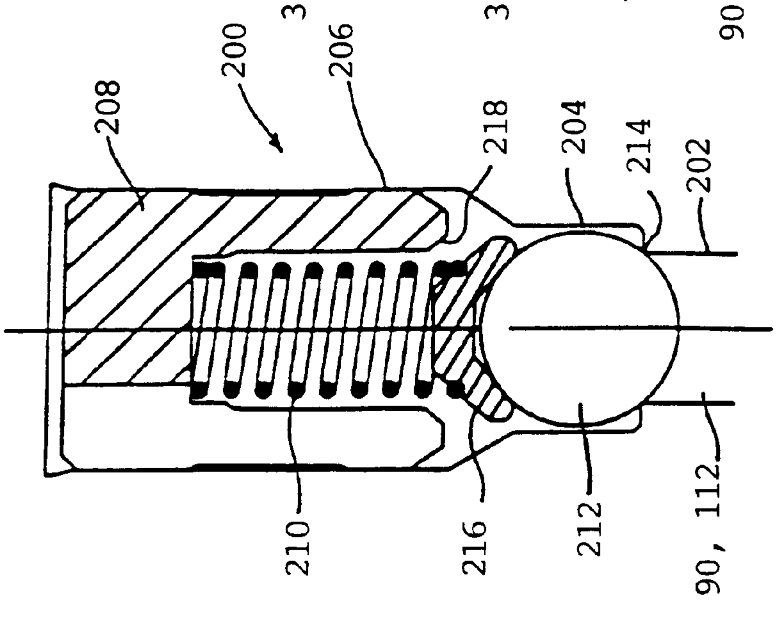
FIG. 5 is a cross-sectional elevational view of a bi-stable check valve in accordance with an alternative embodiment of the present invention.

Referring now to FIGS. 5–7, alternative embodiments of the present invention are illustrated and will be described in detail.

With respect to FIG. 5, as with the previous embodiment, the check valve 200 is positioned in fluid passage 90 or 112 of the unit injector that includes a first reduced diameter section 202, a second reduced diameter section 204 and an enlarged diameter section 206 with a retainer 208 being positioned in the enlarged diameter section 206. Again, as with the previous embodiment, the retainer 208 retains a compression spring 210 which in the absence of fluid pressure on the ball 212 forces the ball 212 into contact with a valve seat 214. Again, as is readily seen from FIG. 5, a spacing is provided between the ball 212 and the second reduced diameter section 204. This spacing again being on the order of 1.25 $mm^2$. Unlike the previous embodiment, a positioning element 216 is provided for contacting the ball 212 and maintaining the ball 212 in a stable position during displacement of the ball 212 from the valve seat 214 to the conical receiving surface 218. Moreover, with the previous embodiment and those embodiments to follow, the ball itself contacts the conical receiving surface. However, with the embodiment illustrated in FIG. 5, it is the positioning element 216 which includes a complimentary conical surface which contacts the conical receiving surface 218 of the retainer 208. In doing so, the ball 212 is maintained centrally within the second reduced diameter section 204 thus forming a consistent orifice between the ball 212 and second reduced diameter section 204 for controlling fluid flow through the valve as with the previous embodiment. Again, the size of the ball 212 may be readily changed in order to change the orifice formed between the ball 212 and the second reduced diameter section 204.

Similarly, FIG. 6 illustrates yet another alternative embodiment of the bi-stable check valve. The bi-stable check valve 300 includes a first reduced diameter section 302 and second reduced diameter section 304 as well as an enlarged diameter section 306. Received within the enlarged diameter section 306 is a retainer 308 which retains a compression spring 310 as with the previous embodiments. In accordance with the present invention, the ball 312 is maintained in contact with a valve seat 314 formed between the first reduced diameter section 302 and the second reduced diameter section 304 by way of a force exerted on the ball 312 by the compression spring 310. With the present embodiment, a positioning element 316 is provided, however, the positioning element is sized so as to be received within the retainer 308. In this regard, it is the ball 312 itself which contacts the conical receiving surface 318 as with the preferred embodiment. In this embodiment, however, a greater surface area is contacted by the positioning element which inhibits any movement of the ball 312 in the lateral direction with respect to the fluid flow direction through the valve. Again, with the ball positioned against the conical receiving surface 312, a fluid flow orifice is formed between the reduced diameter section 304 and ball 312. As with the preferred embodiment, the fluid flow orifice in accordance with the present invention is preferably approximately 1.25 $mm^2$. However, this sizing of the orifice may be readily changed by selecting a ball of varying diameter. In doing so, the spacing between the ball 312 and second reduced diameter section 304 will vary in accordance with the diameter of the ball selected. Accordingly, the fluid flow through the check valve 300 is directly dependent upon the sizing of the ball 312.

Referring now to FIG. 7, yet another alternative embodiment of the bi-stable check valve is illustrated. The valve 400 similarly includes a first reduced diameter section 402 and a second reduced diameter section 404 as well as an enlarged diameter section 406. The enlarged diameter section again receives a retainer 408 with the retainer 408 including a conical receiving surface 418. In addition to the compression spring 410 received within the retainer 408, a central bore 420 is formed in the retainer for receiving a pilot pin 422 which is secured to the ball 412 and extends through the coils of the compression spring and into the bore 420. The pilot pin 422 is provided in order to assure the linear movement of the ball 412 between the closed and opened positions of the check valve. Again, upon application of a fluid pressure within the first reduced diameter section 402, the ball 412 is displaced from the valve seat 414 and into contact with the conical receiving surface 418. As with the previous embodiments, a uniform spacing is maintained between the ball 412 and second reduced diameter section 404 thus forming a fluid flow orifice therebetween. This orifice being on the order of 1.25 $mm^2$. Further, as with the previous embodiments, the sizing of the orifice may be readily changed by merely selecting a ball 412 of varying diameter. Accordingly, a check valve which may provide for variable flow therethrough may be achieved without changing the diameter of the fluid passage which the valve is placed. Moreover, because the ball 412 of the check valve is maintained in a stable position in the opened condition, variations in the size of the orifice provided is minimized and consequently stable and consistent flow through the valve is achieved.

As can be seen from the foregoing description, with each of the embodiments, the ball element of the check valve is maintained in a stable condition when the valve is in the open position as illustrated in FIG. 4C. In doing so, the accuracy of the metering of fuel to a high pressure unit injector is assured. Further, by stabilizing the position of the ball element when the check valve is in the open condition, the amount of fuel which passes through the check valve may be readily controlled by a selection of the diameter of the ball within the check valve thereby providing a predetermined orifice between the ball and reduced diameter section of the valve housing formed by outer barrel 56 or spacer 58.

While, as described for the foregoing embodiments, the injector body can directly house the inventive check valves within a flow passage thereof, preferably, the valves are formed as cartridge type check valves having their own valve housings. In this way, the check valves can be calibrated outside of the injector, and then, can be merely inserted into a respective bore of injector body without affecting the calibration. Also, a cartridge design eliminates the need to precision machine internal passages of the injector body where the check valves are to be housed. Preferred timing and injection metering check valves of the cartridge type will now be described.

Figure 8:
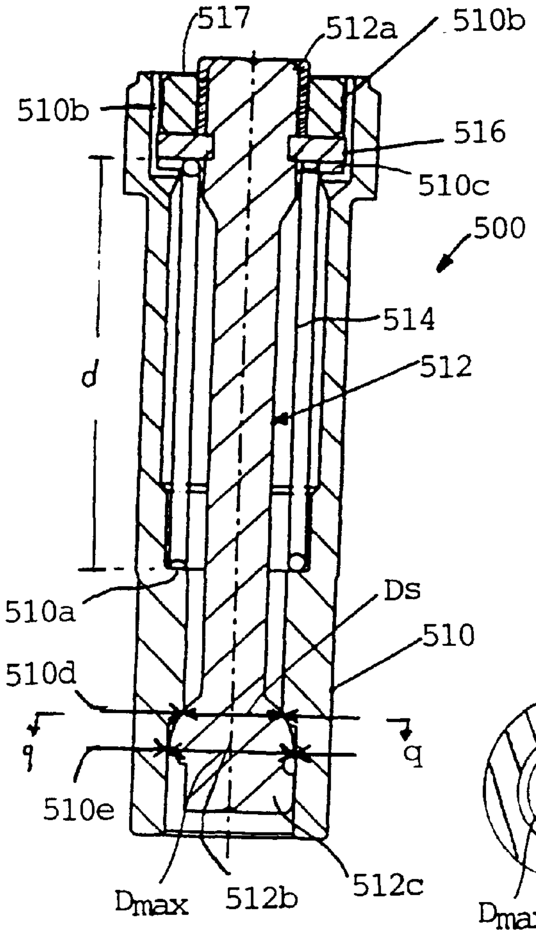
FIG. 8 is a cross-sectional view taken longitudinally through an cartridge type injection metering check valve in accordance with the present invention.
Figure 9:
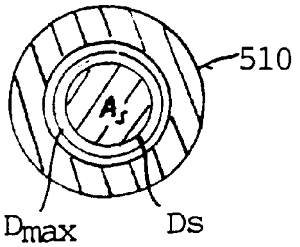
FIG. 9 is a cross-sectional view taken transversely through the injection metering check valve of FIG. 8, taken along line 9—9 thereof.

FIGS. 8 and 9 show a cartridge type injection metering check valve in accordance with the present invention.

Figure 12:
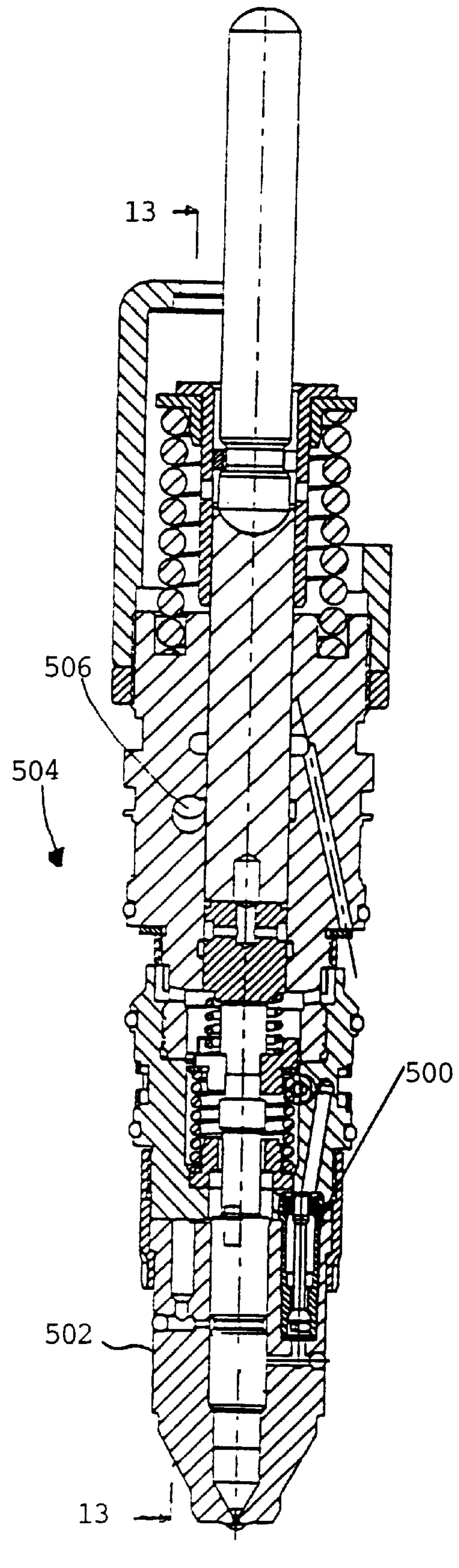
FIGS. 12 and 13 are cross-sectional views showing, respectively, the preferred embodiment injection metering check valve of FIGS. 8 & 9 and the preferred embodiment timing check valve of FIGS. 10 & 11 in place within an open nozzle fuel injector in accordance with the invention, FIG. 13 being a section taken along line 13—13 of FIG. 12.
Figure 13:
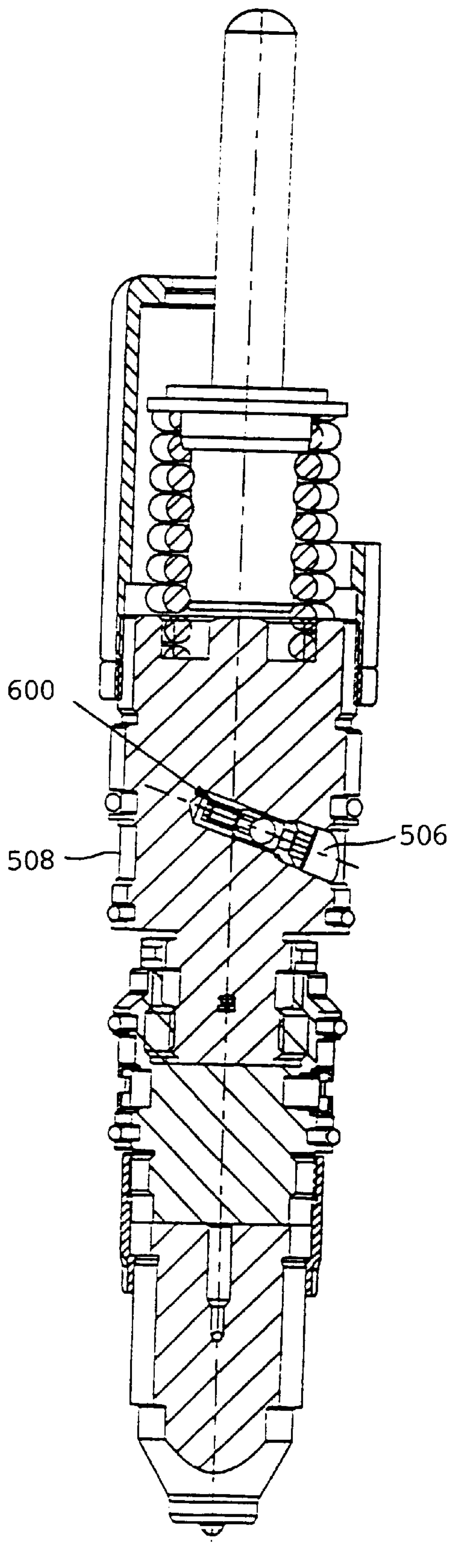

The injection metering check valve 500 can be mounted in the spacer 58 of closed nozzle injector 36 of FIG. 2 or, as shown in FIG. 12, it can be mounted within a bore of lower barrel 502 of an open nozzle type injector 504. Likewise, the timing check valve 600 can be mounted in the outer barrel 56 of the closed nozzle injector 36 of FIG. 2 or, as shown in FIG. 13, can be mounted within a bore 506 of the outer barrel 508 of the open nozzle type injector 504. Apart from the presence of the check valves 500, 600 and their use for metering, not only back-flow preventing, purposes, the injector 504 is of a conventional open nozzle unit fuel injector design as such are known, for example, from U.S. Pat. No. 5,299,738. Thus, a detailed discussion of the construction and operation of this injector will be limited to that relating to the check valves of the present invention and reference can be made to U.S. Pat. No. 5,299,738 to the extent that other information concerning such an open nozzle injector should be necessary.

The injection metering check valve 500 of FIGS. 8 & 9 comprises a cartridge body 510 which is secured in place (for example, by threading) within a bore in the injector body, forms a housing for a valve member 512 and a compression spring 514. Spring 514 acts between an internal shoulder 510*a* of the cartridge body 510 and a spring holder 516 that is threaded onto the upstream end 512*a* of valve member 512. The spring holder 516 is locked in place on end 512*a* by an annular steel ring 517 that is interference fit over upstanding fingers 516*a* of the spring holder 516, clamping them against the threaded end 512*a* of the valve member 512 after it has been axially set to produce the desired maximum opening stroke of the valve member 512 (i.e., by setting the distance between the surface of a stop shoulder 510*c* and the underside of spring holder 516) and the required preload on the spring 514 (determined by the distance d between the shoulder 510*a* and the underside of spring holder 516 in the closed position of the valve illustrated). To enable flow to bypass the upstream end 512*a* of valve member 512 and the spring holder 516 mounted thereon, spaced 90° apart, four grooves 510*b* are milled into the top side of stop shoulder 510*c* and the inner wall of the cartridge body 510 above this shoulder stop.

For controlling flow through the valve 500, valve member 510 has a partially spheric flow control portion 512*b,* a first diameter of which $D_s$ engages a valve seat 510*d* formed by an internal shoulder of the cartridge body 510 in the closed position shown. The spheric flow control portion 512*b* has a maximum diameter $D_{max}$ which is smaller than the inner diameter 510*e* of the portion 518 of a flow passage through the check valve 500 that is located downstream of the valve seat 510*d.* The axial extent of the maximum diameter $D_{max}$ is limited to 0.5 mm and sharply falls off thereafter in order to minimize viscosity and cavitation effects. The downstream end of the flow control portion 512*b* is a triangular lobe 512*c,* the corners of which provide centering guidance for it due to its close spacing from the inner wall of the portion 510*e* of a flow passage through the check valve 500.

The volume at the downstream end of the valve member 512 has been held to a minimal amount, the passage portion 518 merely being sufficient to accommodate the maximum possible opening movement of the end of the valve member 512 downstream of the valve seat 510*e.* By this means, in comparison to the ball type check valve embodiments described above, valve 500 can obtain more precise fuel metering leading improved engine performance in terms of transient response and emissions characteristics. In this regard, it is noted that the minimizing of the volume downstream of the valve member 512, while critical to engine performance, transient response characteristics and emissions, is not essential to engine timing.

Figure 10:
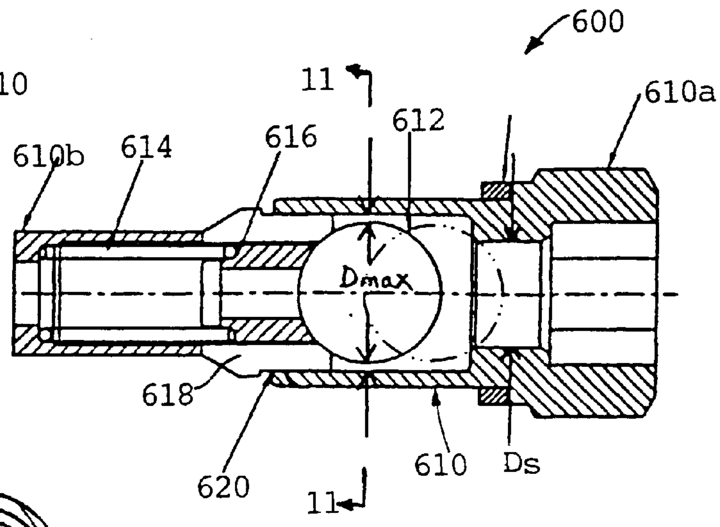
FIG. 10 is a cross-sectional view taken longitudinally through a cartridge type timing check valve in accordance with the present invention.
Figure 11:
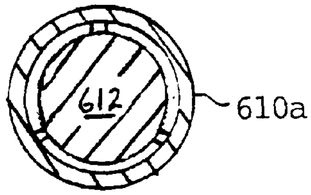
FIG. 11 is a cross-sectional view taken transversely through the timing check valve of FIG. 10, taken along line 11—11 thereof.

Since minimization of the valve volume downstream of the valve seat is not critical to timing control, the timing metering check valve can be of the less costly ball type check valve described above, or can have the preferred form shown for the timing metering check valve 600 shown in FIGS. 10 & 11. Here, the valve 600 has a two-piece cartridge body 610 which is secured in place within a bore in the injector body (for example, by a threading on cartridge body flow control part 610*a*), and forms a housing for a ball type valve member 612 and a compression spring 614. Spring 614 acts between an inner end of cartridge body retainer part 610*b* and a positioning element 616 which engages a downstream side of the ball type valve member 612. Three equidistantly spaced fins 618 of retainer part 610*b* are pressed in and welded in place within the end 620 of the flow control part 610*a.* In addition to serving as a means of attaching the cartridge body parts 610*a,* 610*b* together, these fins 618 provide centering guidance for positioning element 616 and an opening movement stop for the ball type valve member 612, as well as defining the outlet flow path from the downstream end of the valve 600. By setting the degree to which fins 618 extend into the flow control part 610*a,* the required preload on spring 614 can be obtained.

FIG. 10 shows valve 600 with the ball type valve member 612 in its fully open position in solid lines and in its closed position in double dot-dash line.

Figure 14:
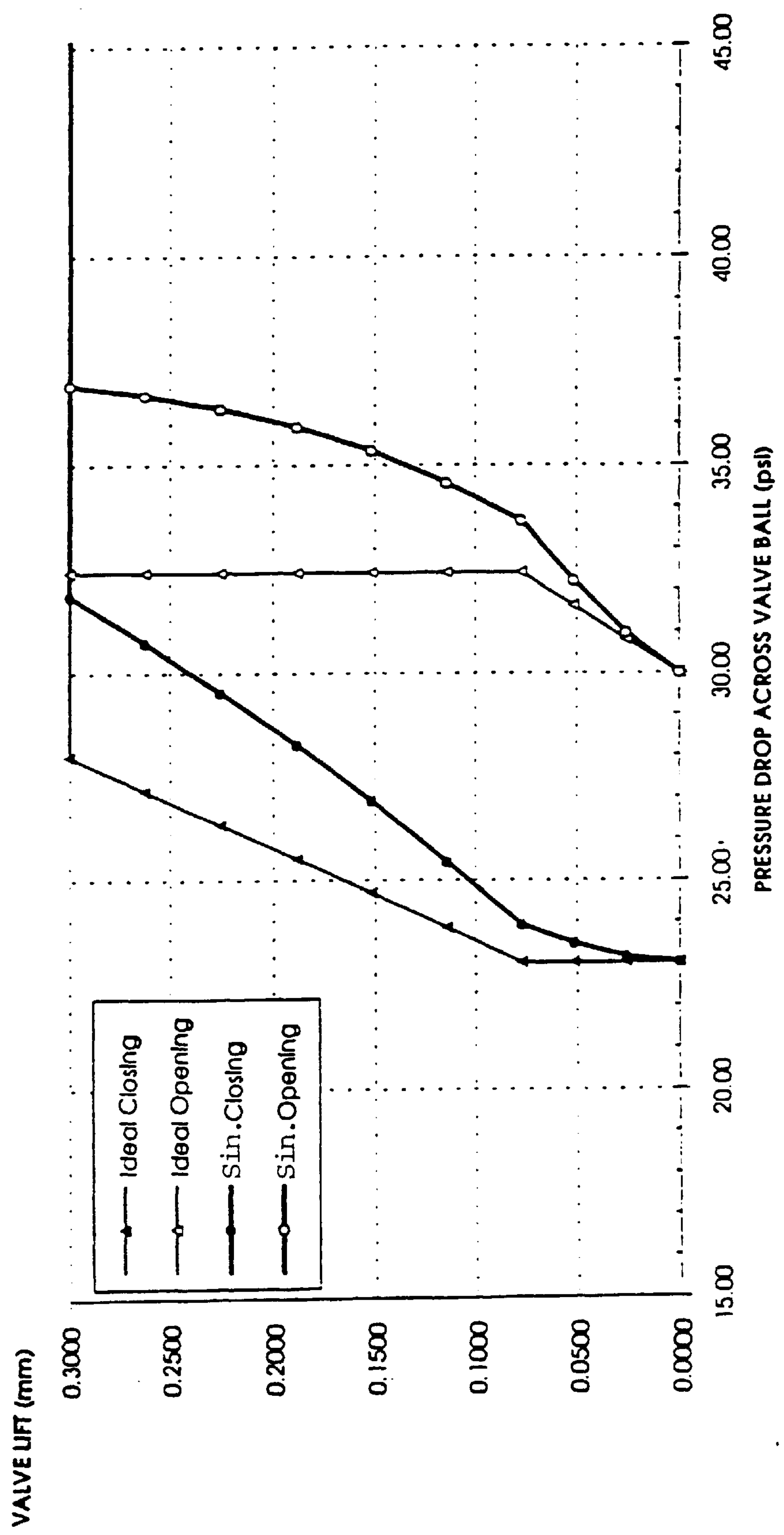
FIG. 14 is a graphic depiction of the relationship between valve lift and pressure drop across a valve ball of metering check valves in accordance with a realistic simulation of the present invention as compared to ideal values.

FIG. 14 is a graphic depiction of the relationship between valve lift and pressure drop across a valve ball of metering check valves in accordance with the present invention as compared to ideal values. The conditions shown there reflect a bi-stable operation of the valve in which a full open position is achieved within 0.5 msec.

Figure 15:
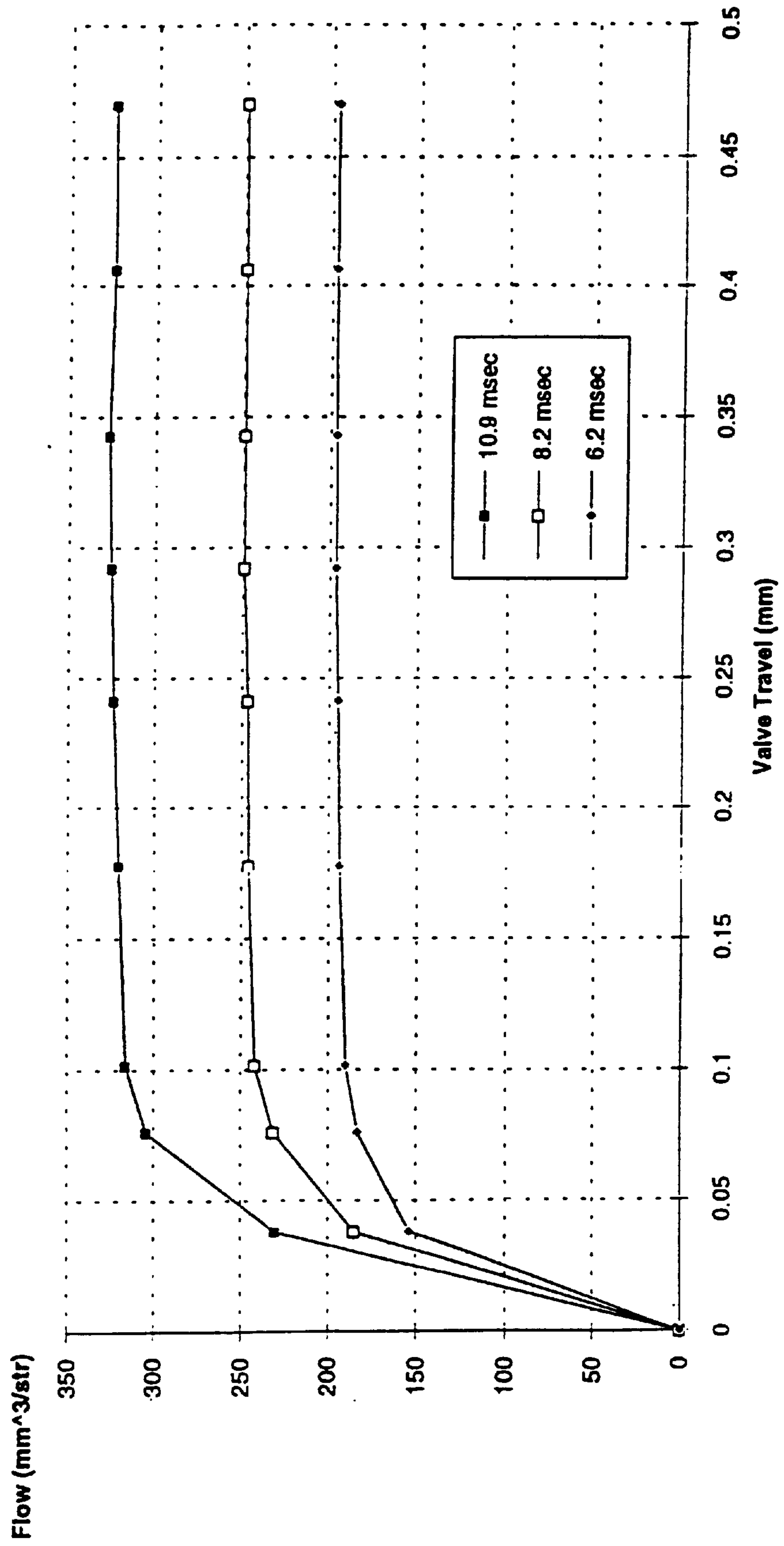
FIG. 15 is a graphic depiction of the relationship between valve travel and flow volume for different flow rates for metering check valves in accordance with the present invention.

FIG. 15 is a graphic depiction of the relationship between valve travel and flow volume for different flow rates for metering check valves in accordance with the present invention. As shown, for the three different flow rates show (pulsed flow at pulse rates of 6.2, 8.2, and 10.9 msec.), despite the flow variations, in each case a precise flow rate control is achieved with the flow having stabilize within the first quarter of the valve opening stroke, and which is achieved in a fraction of a millisecond, as noted relative to FIG. 14.

Figure 16:
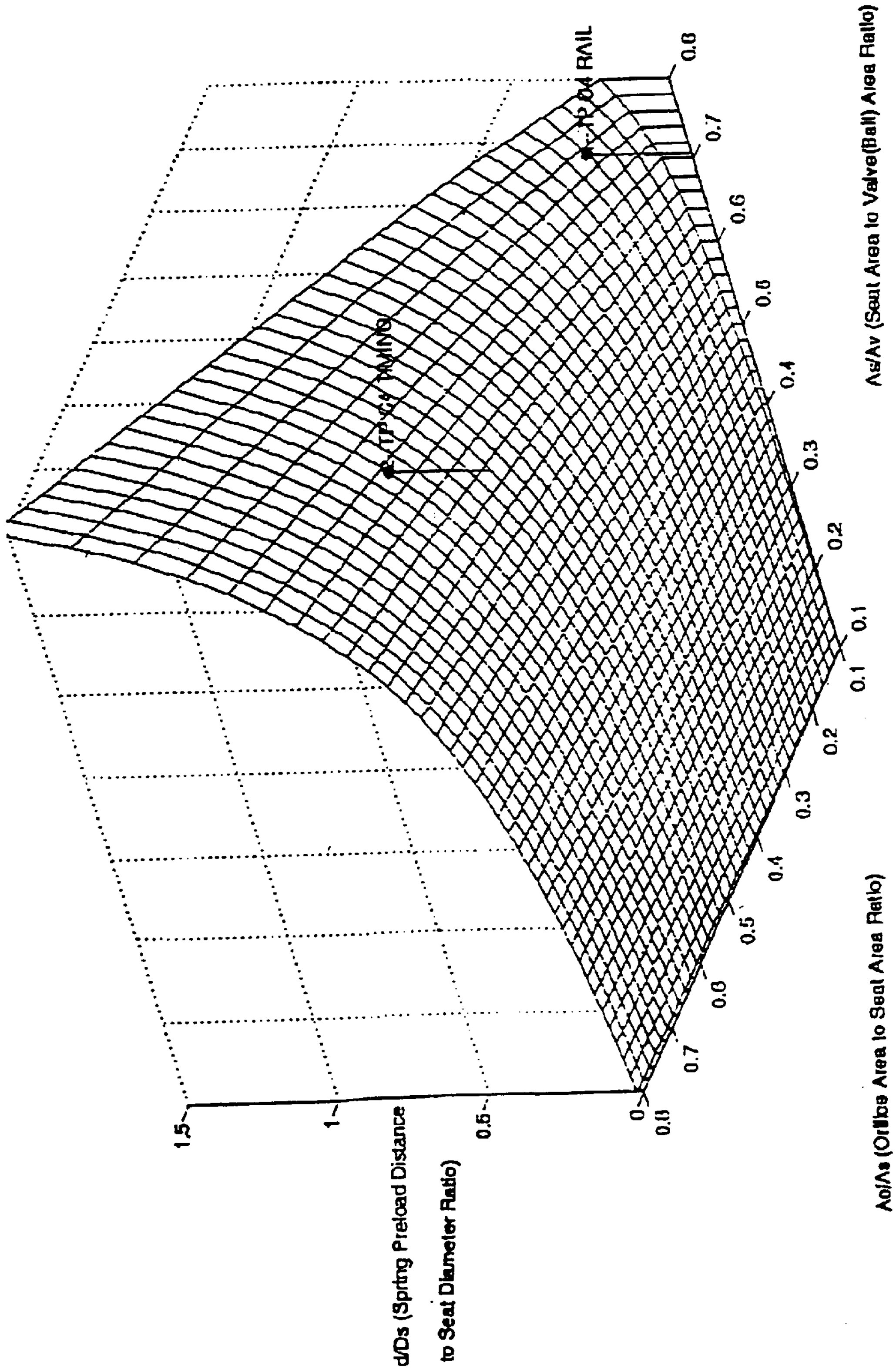
FIG. 16 is a graphic depiction of ideal bi-stable limits for check valves as a function of the seat area to valve area ratio, the orifice area to seat area ratio and the valve spring preload distance to seat diameter ratio.

As point out in the Summary portion of this application, in accordance with the invention, the precision fuel metering capability of the valve is determined by the annular clearance created between the plunger or ball of the valve member, e.g., 512, 612 and the valve body, e.g., 510, 610 when the valve is in its maximum stroke. In designing such valves, three parameters are critical for the operation of the valve: (1) the ratio of the plunger valve seat area to the maximum plunger valve area; (2) the annular clearance area between the plunger valve and the valve body, and (3) the spring rate of the return spring. FIG. 16 graphic depicts the bistable limits for check valves in accordance with the present invention as a function of the seat area to valve area ratio As/Av, the orifice area to seat area ratio Ao/As and the valve spring preload distance to seat diameter ratio d/Ds. On the basis of such a plot, the correct parameters for enabling a bi-stable operation of the valve to obtained together with the appropriate precision metering can be selected that is best for a given application of the valve. By way of example only, one suitable combination of these values for the fuel metering valve application of FIG. 12 is indicated thereon as being values of As/Av≈0.72; Ao/As≈0.1; and d/Ds≈0.52 and for the fuel injector timing valve application of FIG. 13 is indicated thereon as being values of As/Av≈0.636; Ao/As≈0.5; and d/Ds≈0.75.

While the present invention is being described with reference to a preferred embodiment as well as alternative embodiments, it will be appreciated by those skilled in the art that the invention may be practiced otherwise then as specifically described herein without departing from the spirit and scope of the invention. It is, therefore, to be understood that the spirit and scope of the invention be limited only by the appended claims.

INDUSTRIAL APPLICABILITY

The above-mentioned check valve may be utilized in any high pressure system wherein it is essential that the flow of fluid through the check valve be stabilized and that the amount of fluid passing therethrough be controlled such that a known amount of fluid passes through such valve. Again, such valve is particularly useful in the fuel systems of internal combustion engines and particularly within high pressure unit fuel injectors.

We claim:

1. In a fuel injection system for providing combustible fuel to a cylinder of an internal combustion engine, a check valve comprising:

a housing;

a fluid passage extending through said housing, at least a portion of said passage having a predetermined cross-sectional area;

a valve member displaceably positioned in said portion of said fluid passage having said predetermined cross-sectional area, said valve member being displaceable between a closed position in which it engages a valve seat provided in said housing and a fully open position downstream of said valve seat in a fuel flow direction;

positioning means for positioning said valve member with respect to said portion of said passage having said predetermined cross-sectional area; and a biasing means for applying a closure force to said valve member in a direction toward said valve seat;

wherein a maximum diameter of said valve member is related to said predetermined cross-sectional area of said fluid passage in a manner producing a flow metering orifice of a predetermined size (Ao) between said valve member and said passage when said valve member is in said fully open position;

wherein a ratio of a flow-through area of a valve opening of the valve seat to a maximum cross-sectional area of the valve member (As/Av ratio) is set large enough to form a means for producing a bi-stable positioning of the valve member in said fully open position when said closure force of the biasing means is overcome by fluid pressure at said valve seat and positioning said valve member in said closed position otherwise; and wherein when said As/Av ratio, a ratio of said orifice area to said area of the valve opening of the valve seat area (Ao/As ratio), and a ratio of a valve spring preload distance to a seat diameter (d/Ds ratio) are plotted on a three dimensional graph representing a surface defined by a variance of said ratios, the resulting plotted being above the defined surface.

2. The fuel injection system as defined in claim 1, wherein the valve member is a ball; wherein said positioning means comprises a ball stop which is provided in said fluid passage downstream of the ball; wherein said biasing means acts on said ball in a direction away from said ball stop, said ball engaging the ball stop in said fully open position.

3. The fuel injection system as defined in claim 2, wherein said ball stop is positioned within said fluid passage and includes a retainer portion for retaining said biasing means.

4. The fuel injection system as defined in claim 3, wherein said biasing means is a compression spring and at least a portion of said compression spring is received in said retainer.

5. The fuel injection system as defined in claim 4, wherein said retainer includes a plurality of axially extending abutment sections which contact said fluid passage for maintaining said retainer in position in said fluid passage while permitting a flow of fluid therethrough.

6. The fuel injection system as defined in claim 5, wherein an upstream end of each of said axially extending abutment sections includes a tapered surface which compliments a surface of said ball, such that said ball is stabilized by said tapered surfaces and lateral movement of said ball is restricted.

7. The fuel injection system as defined in claim 1, wherein said positioning means is biased against said valve member by said biasing means for axially positioning said valve member within said predetermined cross-sectional area during displacement thereof.

8. The fuel injection system as defined in claim 7, wherein said valve member is a ball and a first surface of said positioning means is complementary to an outer surface of said ball.

9. The fuel injection system as defined in claim 6, further comprising a central bore formed in said retainer and an axially extending pin extending from said ball, wherein said pin extends into and is received by said bore for maintaining the stability of said ball when moving from a closed position to an open position.

10. The fuel injection system as defined in claim 1, wherein said housing is a cartridge body containing said valve member and said biasing means, said housing forming said valve seat and said portion of said passage having said predetermined cross-sectional area.

11. The fuel injection system as defined in claim 10, wherein said valve member is a ball disposed in said cartridge body within said portion of said passage having said predetermined cross-sectional area, said ball engaging said valve seat at a downstream side thereof.

12. The fuel injection system as defined in claim 1, wherein said valve member is plunger valve element having a plunger head within said portion of said passage having said predetermined cross-sectional area, said plunger head sealingly engaging said valve seat at a downstream side thereof; wherein a plunger stem extends from said plunger head, through said valve opening to an upstream end portion of the cartridge body, said biasing means acting said plunger stem in an upstream direction; and wherein the maximum cross-sectional area of the valve member is formed on said plunger head.

13. The fuel injection system as defined in claim 1, wherein said fuel injection system comprises a unit fuel injector, said check valve being disposed within a valve receiving bore of the fuel injector.

14. The fuel injection system as defined in claim 13, wherein said unit fuel injector is an open nozzle fuel injector and said check valve is disposed in a timing fluid flow passage of an outer barrel of the fuel injector.

15. The fuel injection system as defined in claim 14, wherein said valve member is a ball disposed within said portion of said passage having said predetermined cross-sectional area, said ball engaging said valve seat at a downstream side thereof.

16. The fuel injection system as defined in claim 14, wherein said housing is a cartridge body containing said valve member and said biasing means, said housing forming said valve seat and said portion of said passage having said predetermined cross-sectional area.

17. The fuel injection system as defined in claim 13, wherein said unit fuel injector is an open nozzle fuel injector and said check valve is disposed in a fuel metering flow passage of a lower barrel of the fuel injector.

18. The fuel injection system as defined in claim 17, wherein said valve member is plunger valve element having a plunger head within said portion of said passage having said predetermined cross-sectional area, said plunger head sealingly engaging said valve seat at a downstream side thereof; wherein a plunger stem extends from said plunger head, through said valve opening to an upstream end portion of the cartridge body, said biasing means acting said plunger stem in an upstream direction; and wherein the maximum cross-sectional area of the valve member is formed on said plunger head.

19. The fuel injection system as defined in claim 17, wherein said housing is a cartridge body containing said valve member and said biasing means, said housing forming said valve seat and said portion of said passage having said predetermined cross-sectional area.

20. The fuel injection system as defined in claim 8, wherein a ball stop is provided in said fluid passage downstream of the ball; wherein said retainer includes a plurality of axially extending abutment sections which contact said fluid passage for maintaining said retainer in position in said fluid passage while permitting a flow of fluid therethrough; wherein said biasing means acts on said ball in a direction away from said ball stop, said ball engaging the ball stop in said fully open position; wherein an upstream end of each of said axially extending abutment sections includes a tapered surface which compliments a surface of said ball, such that said ball is stabilized by said tapered surfaces and lateral movement of said ball is restricted; and wherein a second surface of said positioning means is complementary to said tapered surface of said abutment sections.

21. In a fuel injection system, a check valve comprising:

a housing;

a fluid passage extending through said housing, at least a portion of said passage having a predetermined cross-sectional area;

a valve member displaceably positioned in said portion of said fluid passage having said predetermined cross-sectional area, said valve member being displaceable between a closed position in which it engages a valve seat provided in said housing and a fully open position downstream of said valve seat in a fuel flow direction;

positioning means for positioning said valve member with respect to said portion of said passage having said predetermined cross-sectional area; and a biasing means for applying a closure force to said valve member in a direction toward said valve seat;

wherein a maximum diameter of said valve member is related to said predetermined cross-sectional area of said fluid passage in a manner producing a flow metering orifice of a predetermined size between said valve member and said passage when said valve member is in said fully open position; and wherein a ratio of a flow-through area of a valve opening of the valve seat to a maximum cross-sectional area of the valve member is set large enough to form a means for producing a bi-stable positioning of the valve member in said fully open position when said closure force of the biasing means is overcome by fluid pressure at said valve seat and positioning said valve member in said closed position otherwise;

wherein said positioning mean is biased against said valve member by said biasing means for axially positioning said valve member within said predetermined cross-sectional area during displacement thereof;

wherein said valve member is a ball and a first surface of said positioning means is complementary to an outer surface of said ball; and wherein a ball stop is provided in said fluid passage downstream of the ball; wherein said retainer includes a plurality of axially extending abutment sections which contact said fluid passage for maintaining said retainer in position in said fluid passage while permitting a flow of fluid therethrough; wherein said biasing means acts on said ball in a direction away from said ball stop, said ball engaging the ball stop in said fully open position; wherein an upstream end of each of said axially extending abutment sections includes a tapered surface which compliments a surface of said ball, such that said ball is stabilized by said tapered surfaces and lateral movement of said ball is restricted; and wherein a second surface of said positioning means is complementary to said tapered surface of said abutment sections.

* * * * *

UNITED STATES PATENT AND TRADEMARK OFFICE
Certificate

Patent No. 6,116,273

Patented: September 12, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yul J. Tarr, Columbus, Indiana; Lester L. Peters, Columbus, Indiana; Bai Mao Yen, Columbus, Indiana; Laszlo D. Tikk, Columbus, Indiana; Ivar L. Johnson, Columbus, Indiana; Daniel G. Burns, Isle of Palms, South Carolina; Mustahsen Gull, Columbus, Indiana; Harry L. Wilson, Columbus, Indiana; George L. Muntean, Columbus, Indiana; and Zhou Yang, South Windor, Connecticut.

Signed and Sealed this Fifteenth Day of January 2002.

MICHAEL P. BUIZ
*Supervisory Patent Examiner*
Art Unit 3753